(12) United States Patent
D'Urso

(10) Patent No.: US 7,707,854 B2
(45) Date of Patent: May 4, 2010

(54) METHOD OF PRODUCING MICROCHANNEL AND NANOCHANNEL ARTICLES

(75) Inventor: Brian R. D'Urso, Clinton, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 710 days.

(21) Appl. No.: 11/687,201

(22) Filed: Mar. 16, 2007

(65) Prior Publication Data
US 2008/0223080 A1    Sep. 18, 2008

(51) Int. Cl.
C03B 37/028  (2006.01)
C03B 37/01   (2006.01)
C03C 25/68   (2006.01)

(52) U.S. Cl. .................. 65/393; 65/408; 65/409; 65/411; 65/429; 65/31

(58) Field of Classification Search ............... 65/393, 65/429, 408, 409, 411, 31
See application file for complete search history.

(56) References Cited

U.S. PATENT DOCUMENTS

| | | | | |
|---|---|---|---|---|
| 2,752,731 A | * | 7/1956 | Altosaar | 65/23 |
| 3,262,251 A | * | 7/1966 | Hicks, Jr. | 96/8 |
| 3,380,817 A | * | 4/1968 | Gardner | 65/393 |
| 3,653,739 A | * | 4/1972 | Strack | 385/115 |
| 4,127,398 A | * | 11/1978 | Singer, Jr. | 65/393 |
| 4,389,089 A | * | 6/1983 | Strack | 385/116 |
| 4,446,024 A | * | 5/1984 | Baker et al. | 210/500.21 |
| 4,629,486 A | * | 12/1986 | Uchiyama et al. | 65/429 |
| 4,853,020 A | * | 8/1989 | Sink | 65/393 |
| 5,034,354 A | * | 7/1991 | Fine | 501/74 |
| 5,234,594 A | * | 8/1993 | Tonucci et al. | 210/500.26 |
| 5,264,722 A | * | 11/1993 | Tonucci et al. | 257/443 |
| 5,306,661 A | * | 4/1994 | Tonucci et al. | 438/494 |
| 5,879,425 A | * | 3/1999 | Jensen | 65/393 |
| 6,174,352 B1 | * | 1/2001 | Semerdjian et al. | 96/8 |
| 7,150,904 B2 | | 12/2006 | D'Urso et al. | |
| 2006/0024478 A1 | | 2/2006 | D'Urso et al. | |
| 2008/0223080 A1 | * | 9/2008 | D'Urso | 65/108 |

FOREIGN PATENT DOCUMENTS

EP    1 016 636    5/2000

OTHER PUBLICATIONS

Pardoe, G.W.F., et. al., "Rapid quenching by the Taylor wire technique", Journal of Materials Science 13 (1978) 786-790.*
Falkenstein, P., "Fused Preforms for the Fabrication of Photonic Crystal Fibers" Optics Letters, 2004, pp. 1858-1860, vol. 29 No. 16.
Tonucci, et al., "Nanochannel Array Glass," Science, 1992, pp. 783-785, vol. 258.
European Patent Office, "International Search Report and Written Opinion," Sep. 24, 2008.

* cited by examiner

Primary Examiner—Jason L. Lazorcik
(74) Attorney, Agent, or Firm—Joseph A. Marasco

(57) ABSTRACT

A method of making an article having channels therethrough includes the steps of: providing a ductile structure defining at least one macro-channel, the macro-channel containing a salt; drawing the ductile structure in the axial direction of the at least one macro-channel to reduce diameter of the macro-channel; and contacting the salt with a solvent to dissolve the salt to produce an article having at least one microchannel.

8 Claims, 6 Drawing Sheets

METHOD OF PRODUCING MICROCHANNEL AND NANOCHANNEL ARTICLES

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

CROSS-REFERENCE TO RELATED APPLICATIONS

Specifically referenced is U.S. Pat. No. 7,150,904 issued on Dec. 19, 2006 to D'Urso and Simpson entitled "Composite, Ordered Material Having Sharp Surface Features", the entire disclosure of which is incorporated herein by reference; the application is available to the public as U.S. Patent Publication No. US 2006/0024478. Also specifically referenced is U.S. patent application Ser. No. 11/460,658 filed on Jul. 28, 2006 by D'Urso and Simpson entitled "Method of Producing Microchannels in Drawn Material", the entire disclosure of which is incorporated herein by reference.

BACKGROUND OF THE INVENTION

Two methods of making "structured" drawn glass, having microchannels or nanochannels in the direction of the draw are commonly known and used. The first method is to start with a preform that contains two kinds of glass. A core glass is easily etched in acid, while a cladding glass is not etchable. The preform is drawn into fiber, cut perpendicularly to the drawing direction into segments, and the segments are bundled together in parallel. The drawing and bundling process can be repeated many times. Finally, the last bundle is fused, sliced perpendicularly to the drawing direction into segments of a desired thickness, and the core glass is etched out from both sides leaving an array of holes. The difficulty is that in cases where a segment is more than a few millimeters thick, the etching process can take a prohibitively long time, since the core glass is etched out through increasingly long, narrow channels. The article produced is known as microchannel or nanochannel glass.

The second method is used to make structured optical fiber (also known as photonic crystal fiber or holey fiber). In this case, the preform has holes (macro-channels) through it which can be produced by bundling solid and hollow rods or by bundling two kinds of glass, fusing and etching out one glass before drawing (Falkenstein, et al, Optics Letters vol. 29, p. 1858, 2004). In either case, the preform has holes through it when it is ready for drawing. The preform is then drawn once or repeatedly to make the fiber. The difficulty is that the holes tend to collapse and/or distort during the final fusing process.

BRIEF SUMMARY OF THE INVENTION

In accordance with one aspect of the present invention, the foregoing and other objects are achieved by a method of making an article having channels therethrough includes the steps of: providing a ductile structure defining at least one macro-channel, the macro-channel containing a salt; drawing the ductile structure in the axial direction of the at least one macro-channel to reduce diameter of the macro-channel; and contacting the salt with a solvent to dissolve the salt to produce an article having at least one microchannel.

In accordance with another aspect of the present invention, a method of making an article having microchannels therethrough includes the steps of: providing a ductile structure defining at least one macro-channel therethrough; depositing a salt composition into the at least one macro-channel; heating the ductile structure to a sufficient temperature so that the ductile structure can be drawn and so that the salt melts; drawing the ductile structure so that the diameters of the at least one macro-channel is reduced; cooling the drawn ductile structure; and contacting the salt with a solvent to dissolve the salt to produce an article having at least one microchannel.

Figure 1:
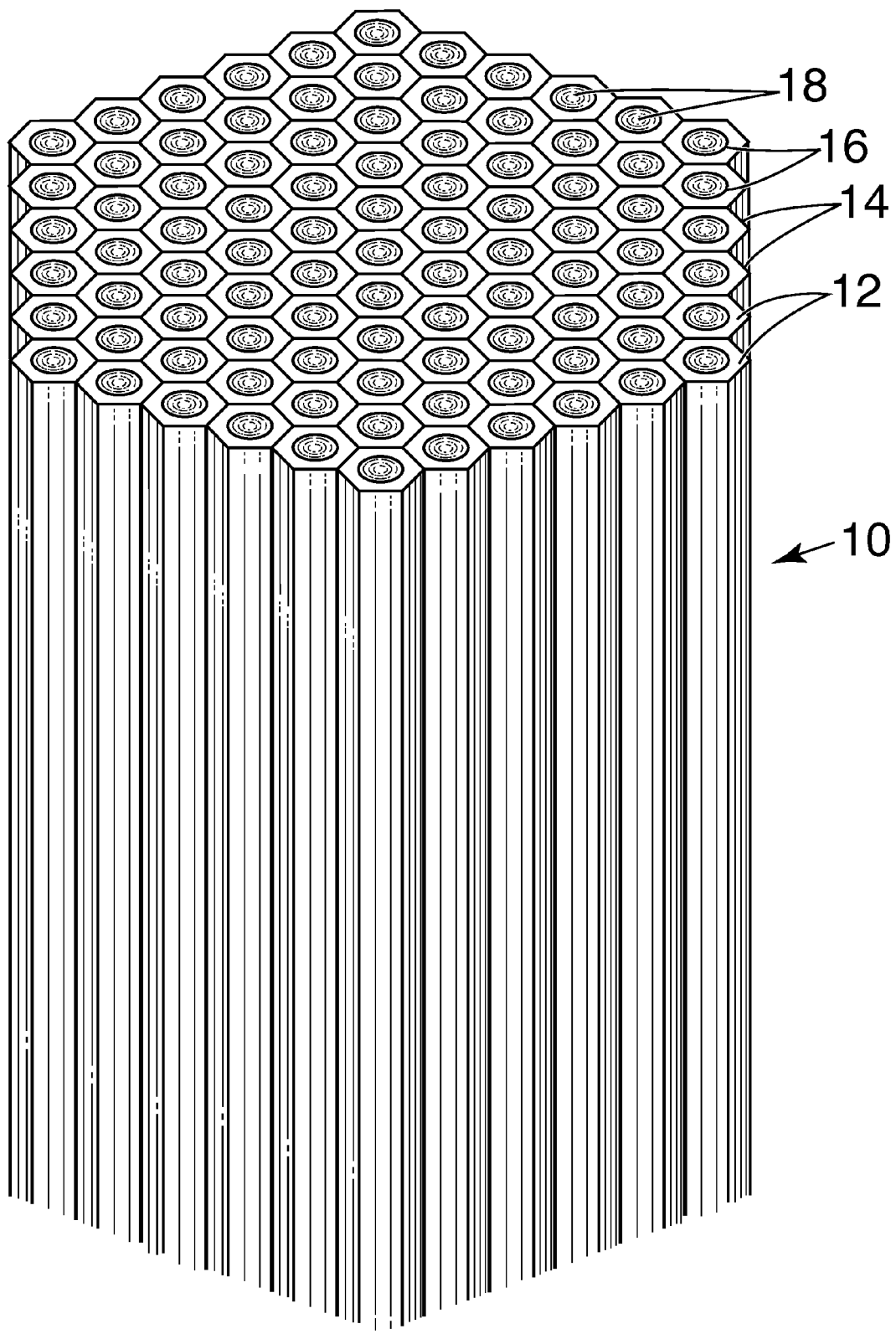
FIG. 1 is a schematic oblique view of a bundle of glass tubes having salt-filled macro-channels in accordance with an embodiment of the present invention.

Several elements that are essentially the same across multiple figs. are assigned like call-out numerals.

For a better understanding of the present invention, together with other and further objects, advantages and capabilities thereof, reference is made to the following disclosure and appended claims in connection with the above-described drawings.

DETAILED DESCRIPTION OF THE INVENTION

The process of the present invention begins with the selection of an appropriate structural composition through which microchannels or nanochannels are desired. The well known terms microchannel and nanochannel are considered to be interchangeable for the purposes of describing the present invention, with the general understanding that nanochannels are generally considered to be smaller in diameter than microchannels.

A ductile structure (i.e., body) should be selected which is appropriate for the intended use in accordance with known criteria. Glass and glassy compositions are especially suitable for making ductile structures such as tubes, for example. Moreover, other amorphous and/or semi-crystalline compositions, such as certain polymers, may also be used. Ductility—the property of being permanently deformed by tension without rupture—is a critical property of an appropriate structural composition in accordance with the present invention. The ductile structure must have the ability to be drawn from a given cross sectional size to a smaller cross sectional size.

The appropriate ductile structure can be formed into one or more tubes, the interiors of which are referred to herein as macro-channels. Inside and outside surfaces of the tube(s) can be, in terms of cross-sectional shape, the same or different, and can be annular, round (circular), triangular, rectangular, hexagonal, other polygonal, or any other shape that is suitable for holding or forming a desired shape during a drawing process. Cross-sectional shape of the tube(s) is not critical to the invention, but may be significant for some particular end-use of the article.

Once appropriate ductile structure is selected, an appropriate salt composition (hereinafter often referred to simply as salt) is selected. An appropriate salt composition may include a single salt compound or a mixture of different salt compounds. It is preferable (but not always necessary) that a salt be selected such that the following four conditions are met:

a. The melting temperature of the salt should be lower than the drawing temperature of the ductile structure. Thus, when the ductile structure is drawn, the salt will flow with the ductile structure.

b. The melting temperature of the salt should be higher than the fusing temperature of the ductile structure. Thus, when the final bundle is fused, the salt maintains the shape of the channels and prevents collapse thereof.

c. The ions in the salt should match the ions in the ductile structure or be inert with respect thereto so that any ion exchange between the ductile structure and the salt either does not alter the composition of the ductile structure, or any such alteration is not deleterious to the application for which the microchannel article is intended.

d. The salt should be soluble in water or another solvent that does not dissolve or etch the ductile structure to any significant extent.

e. Any possible toxicity or other hazard of the salt or salt solution should be considered and mitigated in cases where such minimization would be prudent for safety and/or environmental purposes.

At least one tube made of an appropriate ductile structure is loaded with an appropriate salt composition. The tube may be loaded with powdered or crystalline salt grains or the inside of the tube may be coated with a layer of salt which does not necessarily completely fill the tube.

One can proceed with a bundle of salt-filled tubes. FIG. 1 shows, as an example, bundle 10 of glass tubes 12 having hexagonal outside surfaces 14 and round inside surfaces defining macro-channels 16, the invention not being limited to those particular shapes. The macro-channels 16 contain an appropriate salt composition 18.

Drawing, bundling, and slicing preferably proceed as taught in the published patent applications referenced above. In the drawing process, the glass tubes are heated to the softening point and fused into a monolith. The salt is melted and the melted salt fills the tube, preventing collapse and minimizing the formation of collapsed and/or misshapen microchannels. Drawing, bundling, and slicing can be repeated to produce a preform having the desired dimensions of the desired article are obtained. There are no limitations associated with dimensions of the article, including, for example, size, aspect ratio, number of channels, size of channels, and spacing of channels.

Figure 2:
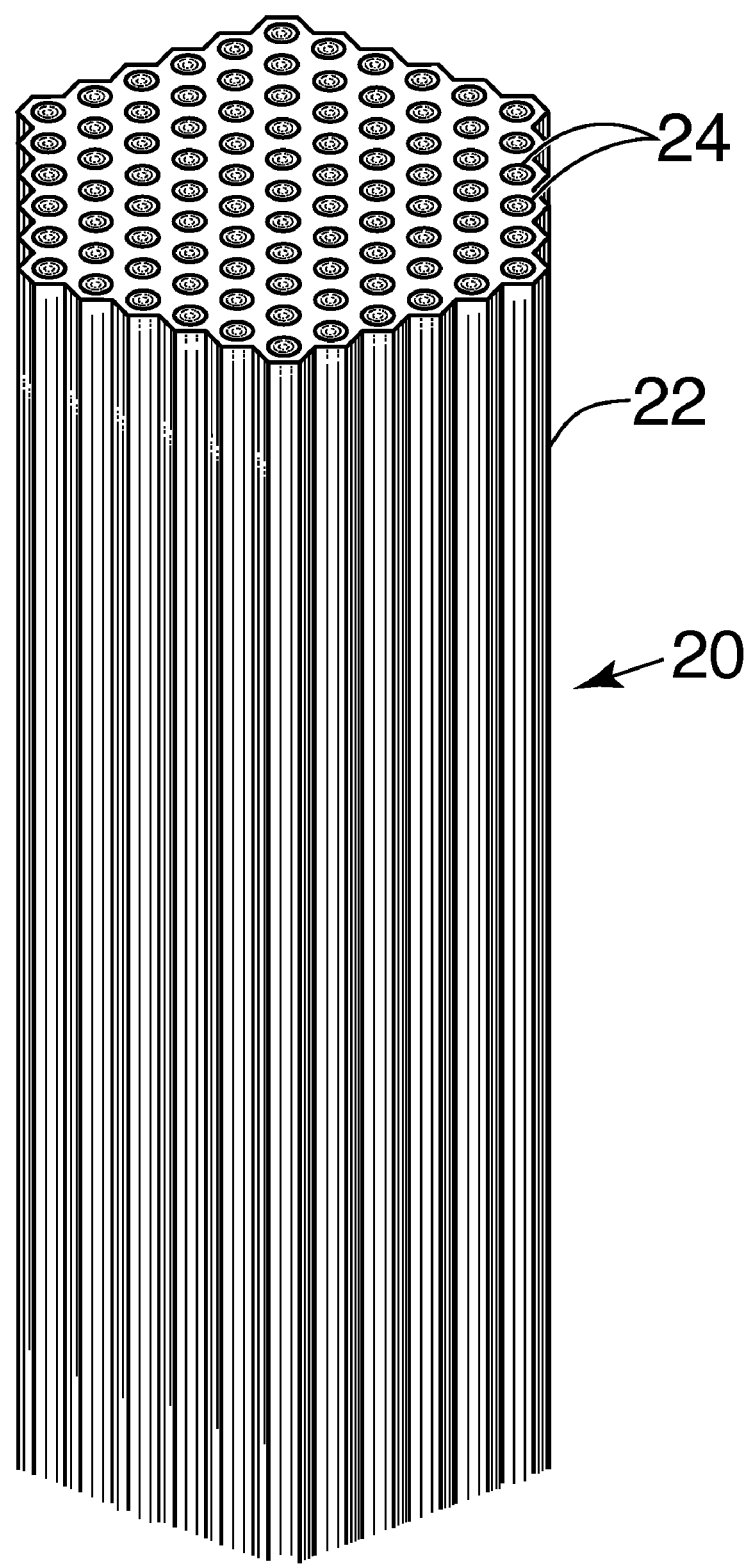
FIG. 2 is a schematic oblique view of the bundle of glass tubes shown in FIG. 1 after drawing and fusing into a glass monolith, showing salt-filled microchannels in accordance with an embodiment of the present invention.

FIG. 2 shows the bundle of glass tubes after drawing and fusing into a preform 20. The glass monolith 22 has well-formed, salt-filled microchannels 24.

Figure 3:
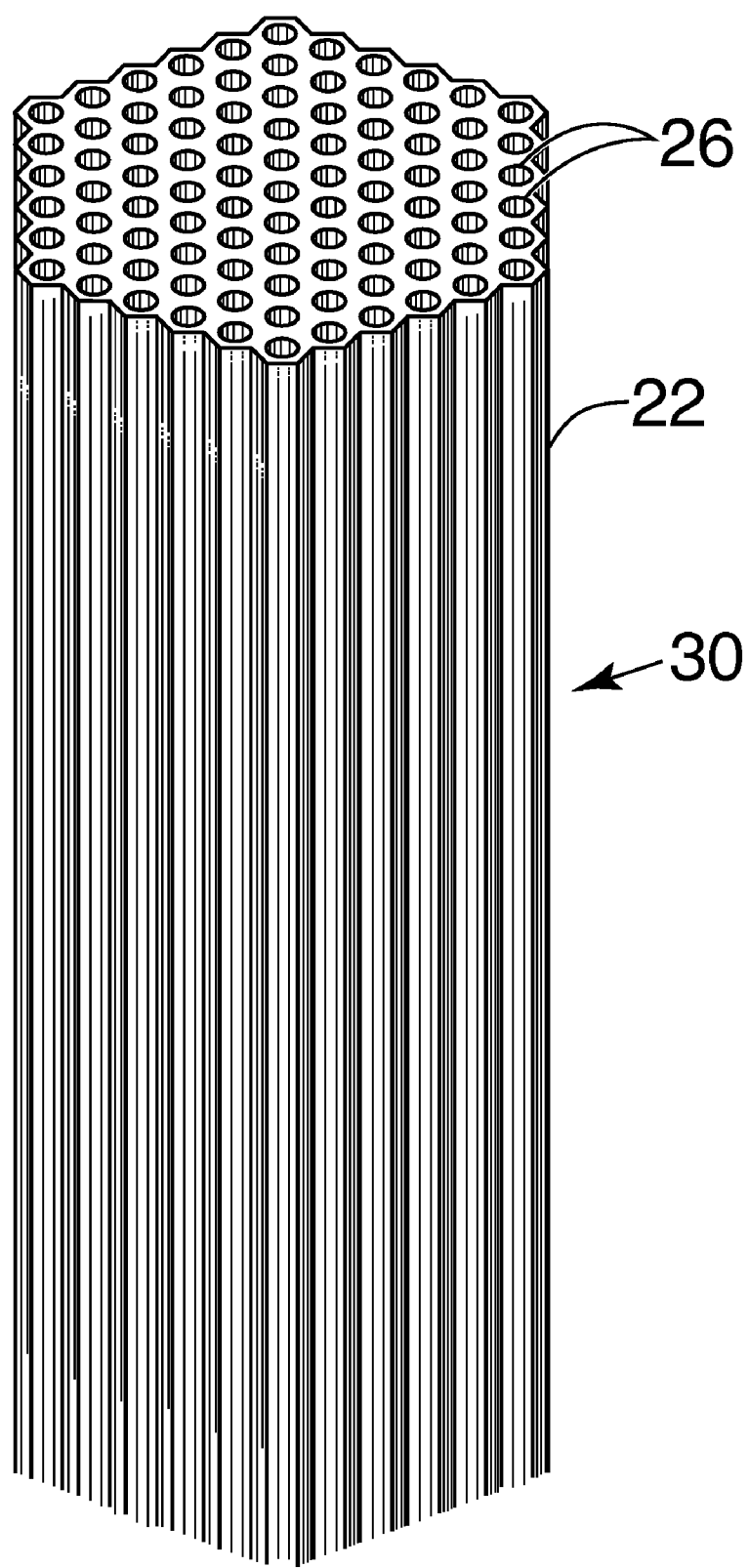
FIG. 3 is a schematic oblique view of the drawn, fused glass monolith shown in FIG. 2 following removal of salt to produce a microchannel glass article in accordance with an embodiment of the present invention.

The salt composition is subsequently dissolved by a solvent and removed from the preform. The preform can be simply immersed in water to dissolve the salt, leaving behind well-preserved channels having little or no collapsing or other distortion. The water may be heated and/or agitated (by circulating, stirring or ultrasonication, for example) to further promote the dissolution and removal of the salt. The water may also be forced through the channels in cases where the salt simply coats the inside of each channel. The resulting microchannel or nanochannel glass may be rinsed by forcing water through the channels to remove any remaining salt. FIG. 3 shows an example of a microchannel glass 30 article made from a preform such as that shown in FIG. 2. The microchannel glass article 30 comprises a glass monolith 22 which defines a plurality of microchannels 26.

Figure 4:
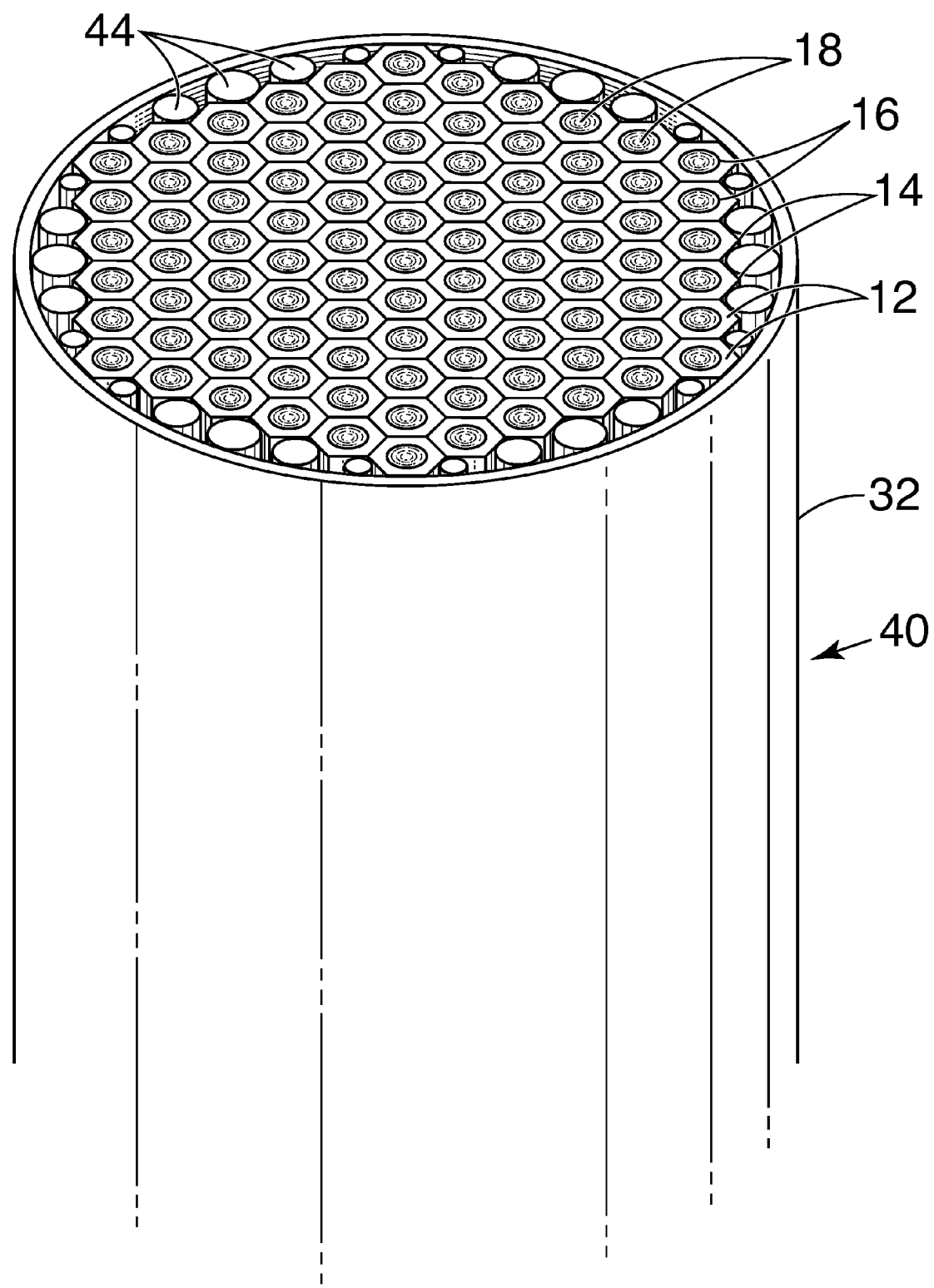
FIG. 4 is a schematic oblique view of a sheathed bundle of glass tubes having salt-filled macro-channels in accordance with an embodiment of the present invention.

Referring to FIG. 4, bundling can be accomplished by inserting a plurality of tubes 12 into a larger tube (sheath) 32 to form a sheathed bundle 40. This can be especially beneficial for the final bundling step because it will generally result in an article having a thicker, more robust outer surface. Glass tubes 12 have hexagonal outside surfaces 14 and round inside surfaces defining macro-channels 16, the invention not being limited to those particular shapes. The macro-channels 16 contain an appropriate salt composition 18. The sheath 32 can be comprised of the same ductile structure as the tubes 12 or a different composition. Voids 42 created by shape mismatches can optionally be filled with filler rods 44, can be comprised of the same ductile structure as the tubes 12 or a different composition.

Figure 5:
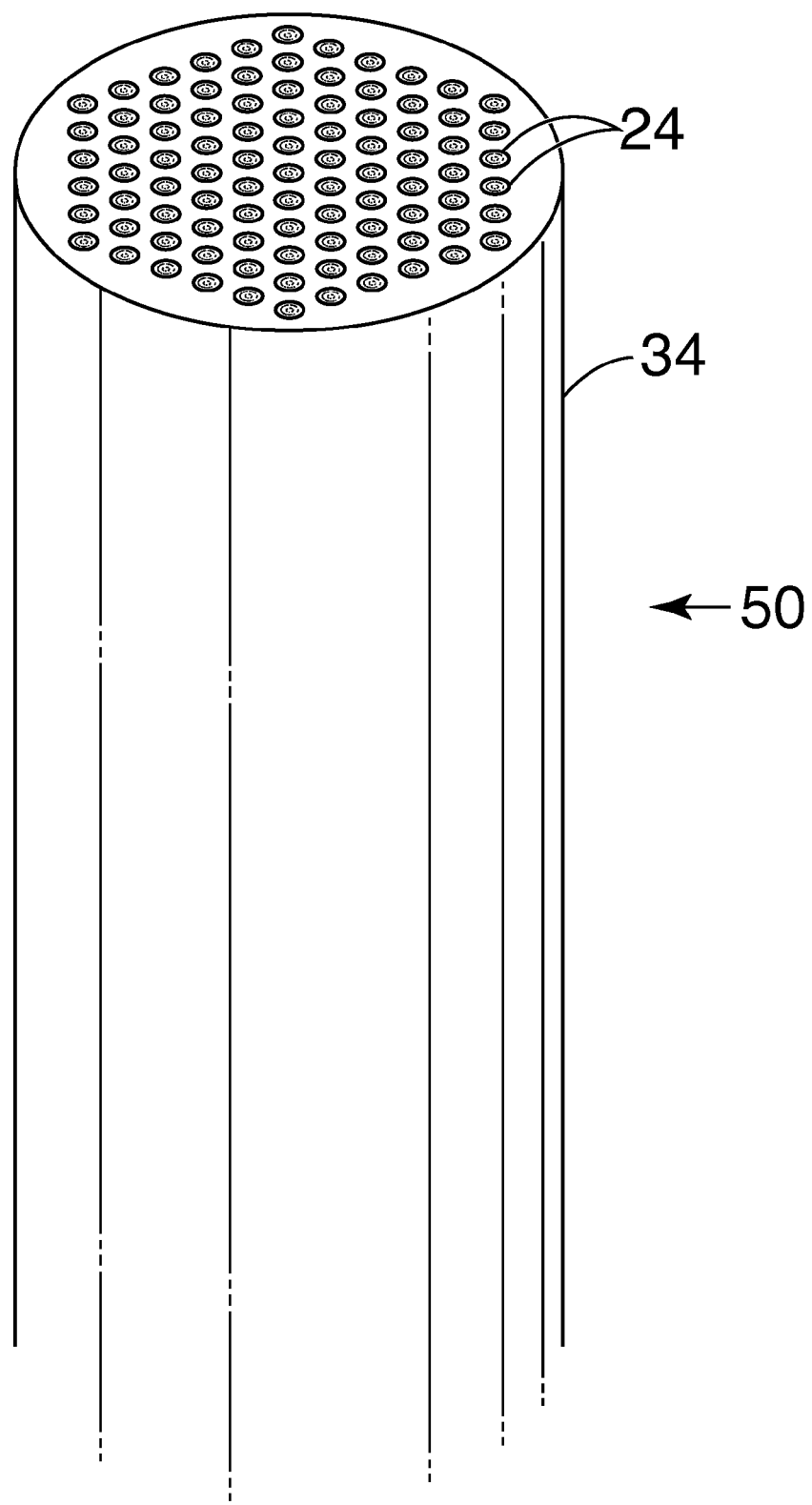
FIG. 5 is a schematic oblique view of the sheathed bundle of glass tubes shown in FIG. 4 after drawing and fusing into a glass monolith, showing salt-filled microchannels in accordance with an embodiment of the present invention.
Figure 6:
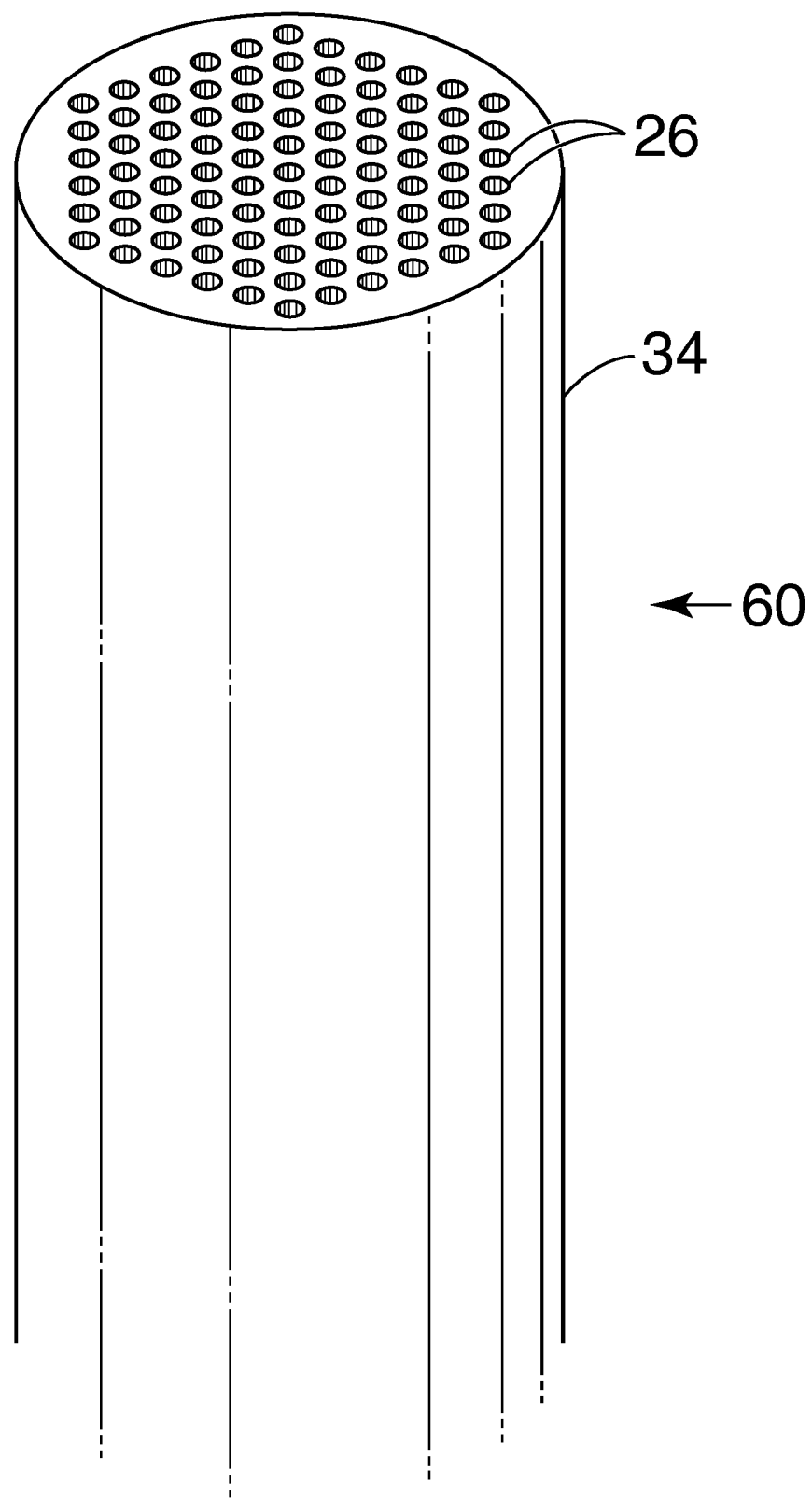
FIG. 6 is a schematic oblique view of the drawn, fused glass monolith shown in FIG. 5 following removal of salt to produce a microchannel glass article in accordance with an embodiment of the present invention.

Referring to FIG. 5, final bundling is generally followed by fusing to produce a monolithic preform 50. The preform 50 comprises a monolith 34 with well-formed, salt-filled microchannels 24. FIG. 6 shows the microchannel glass article 60 after the salt has been removed. The microchannel glass article 60 comprises a glass monolith 34 which defines a plurality of microchannels 26.

Example I

A glass tube comprised of Schott 8330© glass (similar to Corning Pyrex©) was provided. The tube had a length of 1000 mm, an outside diameter of 25 mm, and an inside diameter of 3 mm. The tube was filled with powdered KCl and drawn at about 860° C. to form a fiber having an outside diameter of 0.7 mm.

The fiber was cut into 650 mm lengths, bundled into a hexagonal bundle, and drawn again at 870° C. to form a second fiber having an outside diameter of 0.7 mm. The second fiber was cut into 200 mm lengths, bundled into a Shott 8330© tube (sheath) having a length of 600 mm, an outside diameter of 24.5 mm, and an inside diameter of 22 mm, and heated at 700° C. under vacuum to fuse the bundled tubes and sheath together to form a fused bundle.

The fused bundle was allowed to cool and cut transversely to the drawing direction into to form a plurality of preforms of various lengths ranging from 0.1 cm to 5 cm. The preforms were immersed in distilled water to dissolve the salt, rinsed by forcing water through the channels, and dried to form microchannel glass.

Example II

Microchannel glass was made in accordance with Example I with the exception that the salt composition comprised NaCl and KCl such that the ratio of Na to K was the same as that of the glass composition.

Using the method of the present invention, many advantages and benefits can be realized, including but not limited to the following:

1. Microchannel and/or nanochannel glass may be produced from commercial off the shelf materials, minimizing costs.

2. The glass composition can be a chemically durable, lead free glass for which a matching, easily etched glass is not commercially available.

3. The aspect ratio of the microchannels or nanochannels can be much higher because the dissolution rate of the salt can be high and the contrast in dissolution rate of the salt and glass can be extremely high.

4. The preferred dissolution process utilizes water, a non-hazardous solvent, instead of hazardous acid required by prior methods. Moreover, the process generates a non-hazardous salt solution that can be recycled and reused.

5. The use of salt in accordance with the present invention is feasible at high temperatures that would be pernicious to organic filler materials.

Microchannel and nanochannel glass have many applications including detectors, filters, catalyst supports.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of making an article having channels therethrough comprising:
   a. providing a ductile tube defining at least one macro-channel, wherein said ductile tube comprises a composition selected from the group consisting of a glass, a glassy composition, and a polymer;
   b. filling said at least one macro-channel with a salt to produce a filled ductile tube;
   c. heating said filled ductile tube to a sufficient temperature so that said tube can be drawn and so that said salt melts;
   d. drawing said filled ductile tube in an axial direction of said at least one macro-channel to reduce diameter of said at least one macro-channel and to produce a fiber;
   e. cutting and bundling said fiber into a bundle;
   f. heating and redrawing said bundle to form a fused bundle; and
   g. contacting said fused bundle with a solvent to dissolve said salt to produce an article having at least one microchannel.

2. A method in accordance with claim 1 wherein said ductile tube comprises a glass composition.

3. A method in accordance with claim 1 wherein said salt is characterized by a melting temperature that is lower than a drawing temperature of said ductile tube.

4. A method in accordance with claim 1 wherein said salt is characterized by a melting temperature that is higher than a fusing temperature of said ductile tube.

5. A method of making an article having microchannels therethrough comprising:
   a. providing a plurality of ductile tubes wherein each of said ductile tubes defines at least one macro-channel and wherein each of said ductile tubes comprises a composition selected from the group consisting of a glass, a glassy composition, and a polymer;
   b. forming a bundle of said ductile tubes;
   c. filling said macro-channels with a salt to produce a bundle of salt filled ductile tubes;
   d. heating said bundle of salt filled ductile tubes to a sufficient temperature so that said bundle of salt filled ductile tubes can be drawn and so that said salt melts;
   e. drawing said bundle of salt filled ductile tubes so that the diameters of said macro-channels are reduced;
   f. cooling said drawn bundle of salt filled ductile tubes; and
   g. contacting said drawn, cooled bundle of salt filled tubes with a solvent to dissolve said salt to produce an article having a plurality of microchannels.

6. A method in accordance with claim 5 wherein said plurality of ductile tubes comprises a glass composition.

7. A method in accordance with claim 5 wherein said salt is characterized by a melting temperature that is lower than a drawing temperature of said plurality of ductile tubes.

8. A method in accordance with claim 5 wherein said salt is characterized by a melting temperature that is higher than a fusing temperature of said plurality of ductile tubes.

* * * * *